United States Patent [19]
Ishizuka

[11] Patent Number: 5,175,460
[45] Date of Patent: Dec. 29, 1992

[54] FLAT YOKE TYPE DC MACHINE
[75] Inventor: Toshiyasu Ishizuka, Hamamatsu, Japan
[73] Assignee: Asmo Co., Ltd., Shizuoka, Japan
[21] Appl. No.: 823,461
[22] Filed: Jan. 22, 1992
[30] Foreign Application Priority Data
  Jan. 29, 1991 [JP] Japan .................. 3-029298
[51] Int. Cl.$^5$ ............................. H02K 21/26
[52] U.S. Cl. ............................. 310/154; 310/192; 310/256
[58] Field of Search ........... 310/154, 152, 40 R, 310/40 MM, 46, 89, 192, 254, 256
[56] References Cited
U.S. PATENT DOCUMENTS
4,795,932 1/1989 Long .................. 310/154
4,862,066 7/1987 Abbratozzato et al. ......... 310/154
4,973,871 11/1990 Bisantz ................. 310/154
5,008,578 4/1991 Pace ................... 310/256

Primary Examiner—Steven L. Stephan
Assistant Examiner—Matthew Nguyen
Attorney, Agent, or Firm—Oliff & Berridge

[57] ABSTRACT

A DC motor including a rotatable armature, a pair of permanent magnets functioning as magnetic stator poles, and a flat yoke having a pair of opposed arcuate sections and a pair of opposed flat sections, for receiving the armature. Each of the arcuate sections is formed with a slit extending parallel to the rotational axis of the armature to increase the magnetic reluctance. The magnetic reluctance against a magnetic flux generated by the cross magnetomotive force is increased to reduce the armature reaction by the slits.

7 Claims, 7 Drawing Sheets

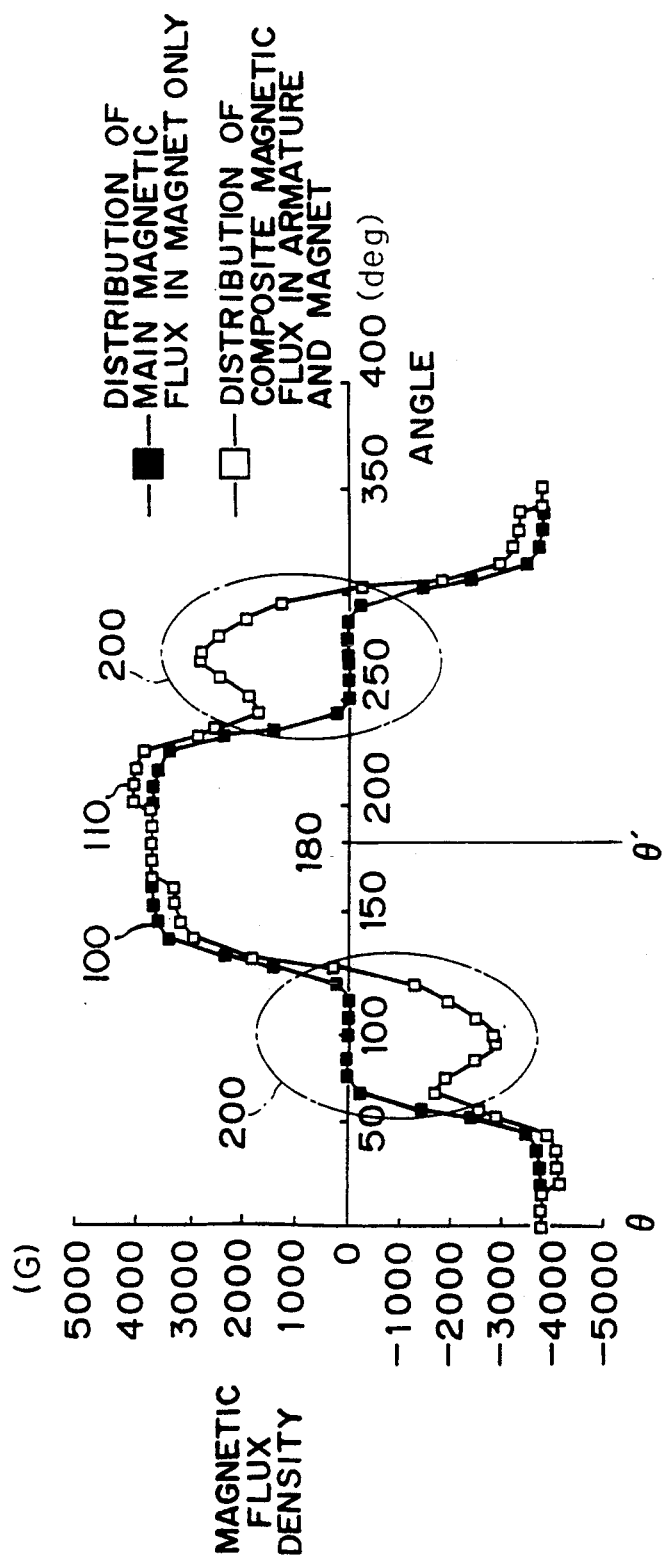

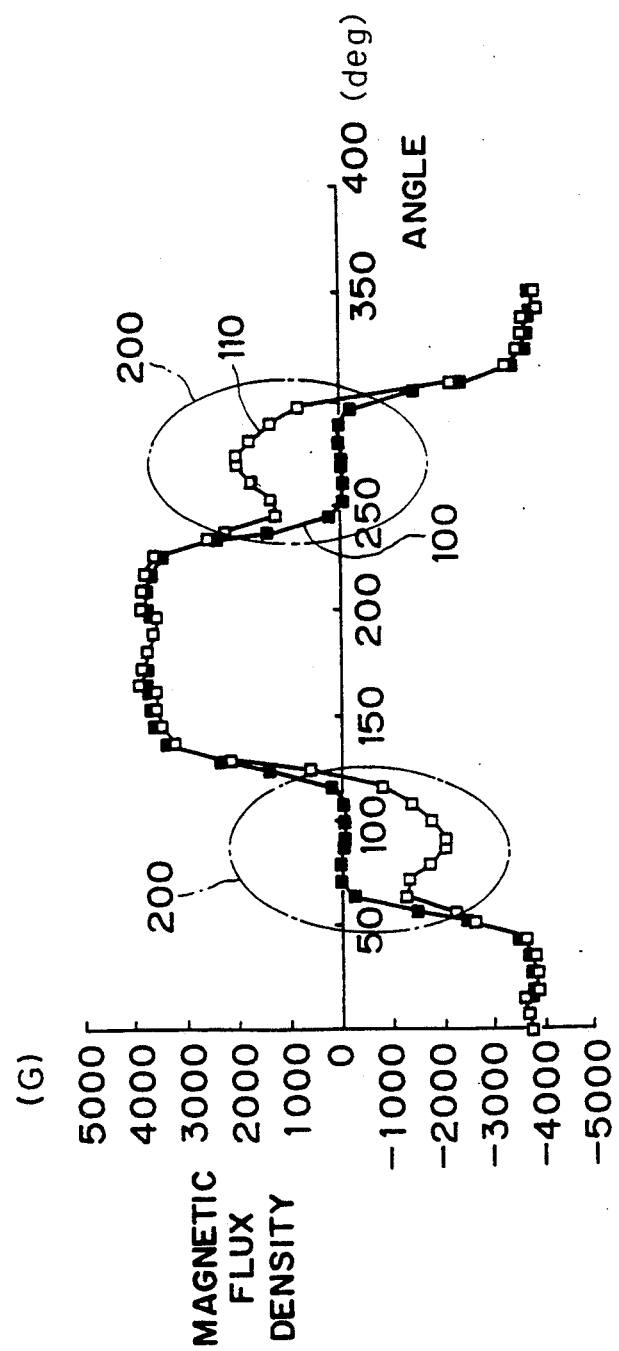

FLAT YOKE TYPE DC MACHINE

BACKGROUND OF THE INVENTION

1. Field of the Invention

The present invention relates to improvements of a flat yoke type DC machine.

2. Description of the Related Art

There is well known a DC motor using a flat yoke. Such a flat yoke type DC motor can utilize space more effectively than a DC motor using a round yoke of the same diameter. The use of the flat yoke type DC motor has increased recently for motorcar parts and other applications.

However, the flat yoke type DC motor has a clearance or air gap between the armature and the yoke, which is smaller than that of the round yoke. This reduces the magnetic reluctance against the cross magnetomotive force. Thus, the flat yoke type DC motor will be influenced by the armature to a greater degree than a round yoke DC motor of the same diameter.

FIG. 3 shows a round yoke type DC motor. FIG. 5 shows a flat yoke type DC motor having the same diameter as that of the round yoke type DC motor shown in FIG. 3. It is well-known in the art that each of the DC motors comprises an armature 10, permanent magnets 12 functioning as magnetic stator poles and a yoke 14.

As is apparent from these figures, the DC motor utilizing the flat yoke 14 shown in FIG. 5 can be reduced in size, but will have a much smaller clearance d between the armature 10 and the yoke 14, than the DC motor utilizing the round yoke 14 shown in FIG. 3. Therefore, the DC motor of FIG. 5 will have considerably lower magnetic reluctance against the cross magnetomotive force and will, therefore, be more highly influenced by the armature reaction. In other words, the magnetic flux generated by the armature coil becomes larger than the conventional level against the main magnetic flux generated by the magnetic stator poles 12. This tends to create a larger magnetic field in the rectified zone due to the cross magnetomotive force.

FIG. 4 shows a distribution of magnetic flux in the round yoke type DC motor shown in FIG. 3 FIG. 6 shows a distribution of magnetic flux in the flat yoke type DC motor shown in FIG. 5. In FIGS. 4 and 6, curve 100 represents a profile of main magnetic flux created by the magnetic stator poles 12 while curve 110 represents a profile of composite magnetic flux generated by combining the main magnetic flux with a cross magnetomotive force produced from the armature reaction. As is apparent from these figures, the distribution of the composite magnetic flux 110 in the rectified zone 200 becomes much higher in the flat yoke rather than the round yoke. As a result, a large magnetomotive force will be formed in the coil when it passes through the rectified zone 200. Each time the rectifying action has been terminated, sparks are produced between the brush and the commutator. This reduces the effective lives of the brush and commutator and also causes noise and motor vibrations.

In order to avoid the adverse affect from the armature reaction, it has been proposed to move the position of the brush to an electrically neutral position at which the composite magnetic field defined by the magnetic field generated from the armature coil and the magnetic field formed from the main magnetic flux becomes zero.

In such a motor its armature is rotated in the opposite, clockwise and counter-clockwise directions, the electrically neutral point is changed depending on the direction of rotation in the armature. It is impossible to shift the brush position to the electrically neutral point at each time the direction of rotation is changed from one to another.

Even in a motor in which the armature is rotated only in a single direction, the electrically neutral point is changed from one position to another depending on the magnitude of a load when the motor is applied for another purpose with the load being changed from one level to another (i.e. the current passing through the armature coil being changed from one level to another). Therefore, the motor must be modified to change the position of the brush for each purpose or application.

Consideration has also been given to using an interpole, or the like, provided to reduce the adverse affect of the armature reaction. It is difficult to secure sufficient space to receive the interpole in the flat yoke type DC motor which is constructed for reducing the size thereof.

Although the flat yoke type DC motor has such problems, it can still be reduced in size and improved in power if the armature coil can be energized by an increased current, since high-performance permanent magnets capable of being used as the magnetic stator poles 12 are available today. However, it is still important to suppress the resulting armature reaction effectively, if an increased current flows through the armature.

SUMMARY OF THE INVENTION

It is the object of the present invention to provide a flat yoke type DC machine which can effectively suppress the adverse affect of the armature reaction.

To this end, the present invention provides a flat yoke type DC machine comprising:

a flat yoke;

magnetic stator poles provided on the inner periphery of said flat yoke;

an armature rotatably supported in said flat yoke; and magnetic reluctance means for increasing the reluctance of a magnetic circuit through which a magnetic flux generated by the cross magnetomotive force passes, said magnetic reluctance means being located in said flat yoke adjacent the inner walls of said magnetic stator poles opposite to said flat yoke to reduce the affection from the armature reaction.

In such an arrangement, the magnetic reluctance against the magnetic flux generated by the cross magnetomotive force can be increased by the magnetic reluctance means, thus affect of the armature reaction.

Moreover, the main magnetic flux produced by the magnetic stator poles is divided into two parts at the inner sides of the magnetic stator poles without passing through the magnetic reluctance region. Therefore, the main magnetic flux will not be substantially affected by the magnetic reluctance means even though it is located on the flat yoke adjacent the inner sides of the magnetic stator poles.

Therefore, the present invention can provide a small-sized and high-power flat yoke type DC machine which can be less affected by the armature reaction since the magnetic flux produced by the cross magnetomotive force can be reduced without affecting the main magnetic flux.

BRIEF DESCRIPTION OF THE DRAWINGS

FIG. 6 is a graph illustrating the distribution of magnetic flux in the flat yoke type DC motor shown in FIG. 5.

FIG. 7 is a graph illustrating the distribution of magnetic flux in a flat yoke type DC motor constructed in accordance with the present invention.

DETAILED DESCRIPTION OF THE PREFERRED EMBODIMENTS

Figure 1:
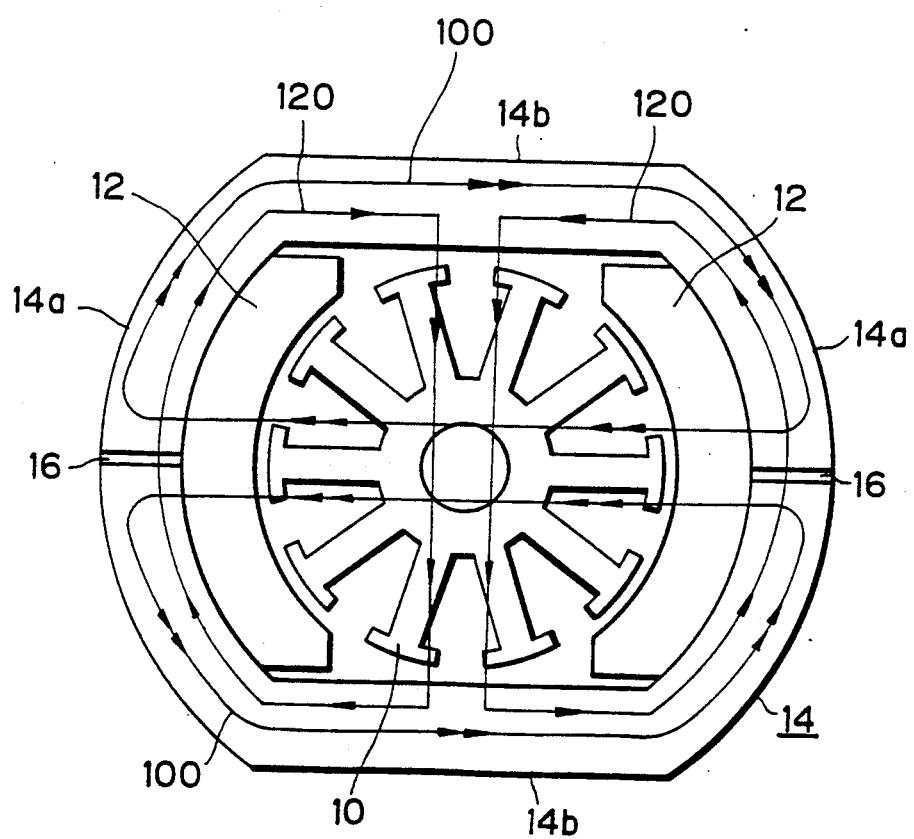
FIG. 1 is a schematic view illustrating a flat yoke type DC motor to which the principle of the present invention is applied.

The present invention will now be described in detail with reference to the drawings which illustrate a preferred embodiment of the present invention in which parts similar to those of the prior art are denoted by similar reference numerals and will not be further described.

Referring to FIG. 1, there is shown a flat yoke type DC motor constructed in accordance with the present invention. The DC motor comprises a rotatable armature 10, a pair of permanent magnets 12 functioning as magnetic stator poles, and a flat yoke 14 for receiving the armature 10.

The flat yoke 14 comprises a pair of opposed arcuate yoke sections 14a on each of which one of the permanent magnets 12 is fixedly mounted at its inner wall, and a pair of opposed flat yoke sections 14b connecting the arcuate yoke sections 14a.

The present invention is characterized by a magnetic reluctance means for increasing the magnetic circuit reluctance of a magnetic flux generated by the cross magnetomotive force. This means is provided adjacent the inner sides of the permanent magnets opposite to the inner walls of the arcuate yoke sections in the flat yoke 14. In this embodiment, the magnetic reluctance means comprises a pair of slits 16 each formed in the arcuate yoke sections 14a of the flat yoke 14 at a position adjacent the central inner wall portions of each of the magnetic stator poles 12 between the top and bottom ends thereof and extending parallel to the rotational axis of the armature 10.

Figure 2A:
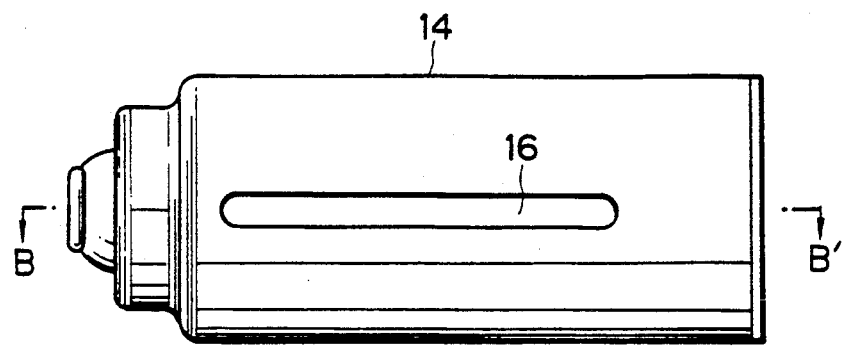
FIG. 2A is a side view of the flat yoke in the DC motor shown in FIG. 1
Figure 2B:
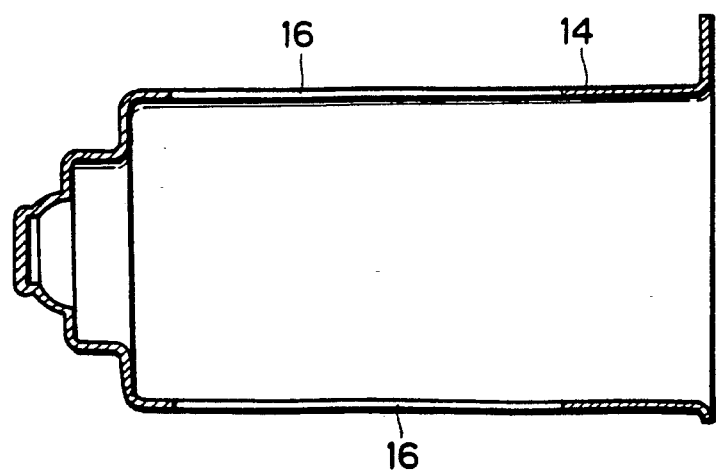
FIG. 2B is a cross-sectional view of the flat yoke, taken along a line B—B' in FIG. 2A.
Figure 3:
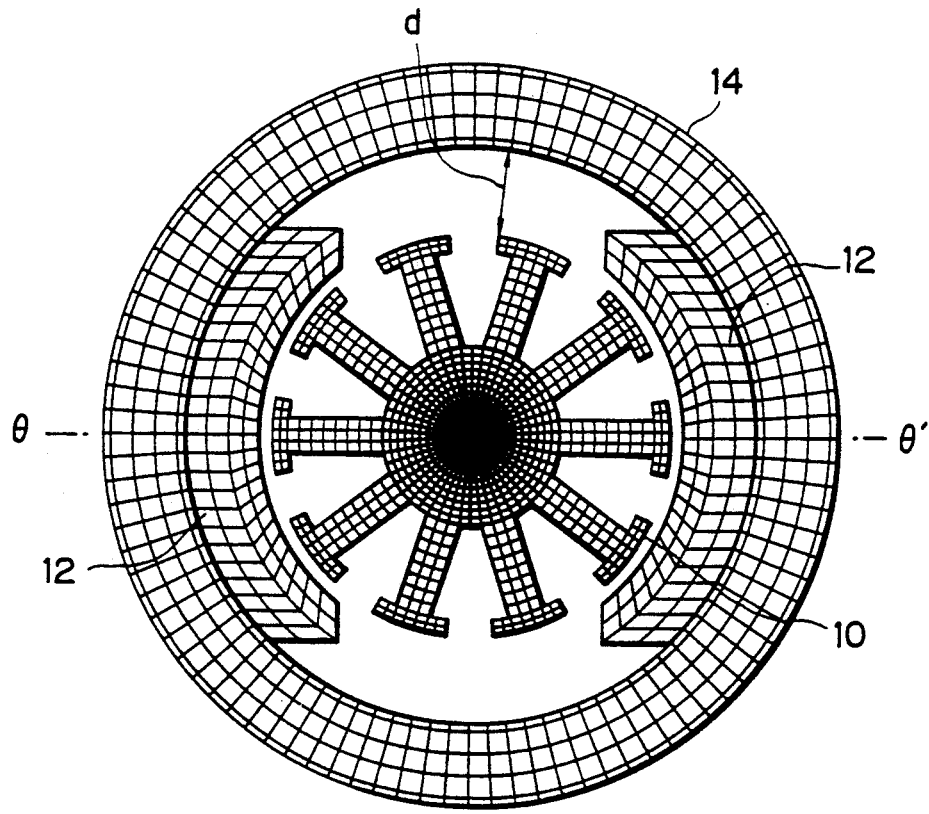
FIG. 3 is a schematic view illustrating a round yoke type DC motor constructed in accordance with the prior art.
Figure 4:
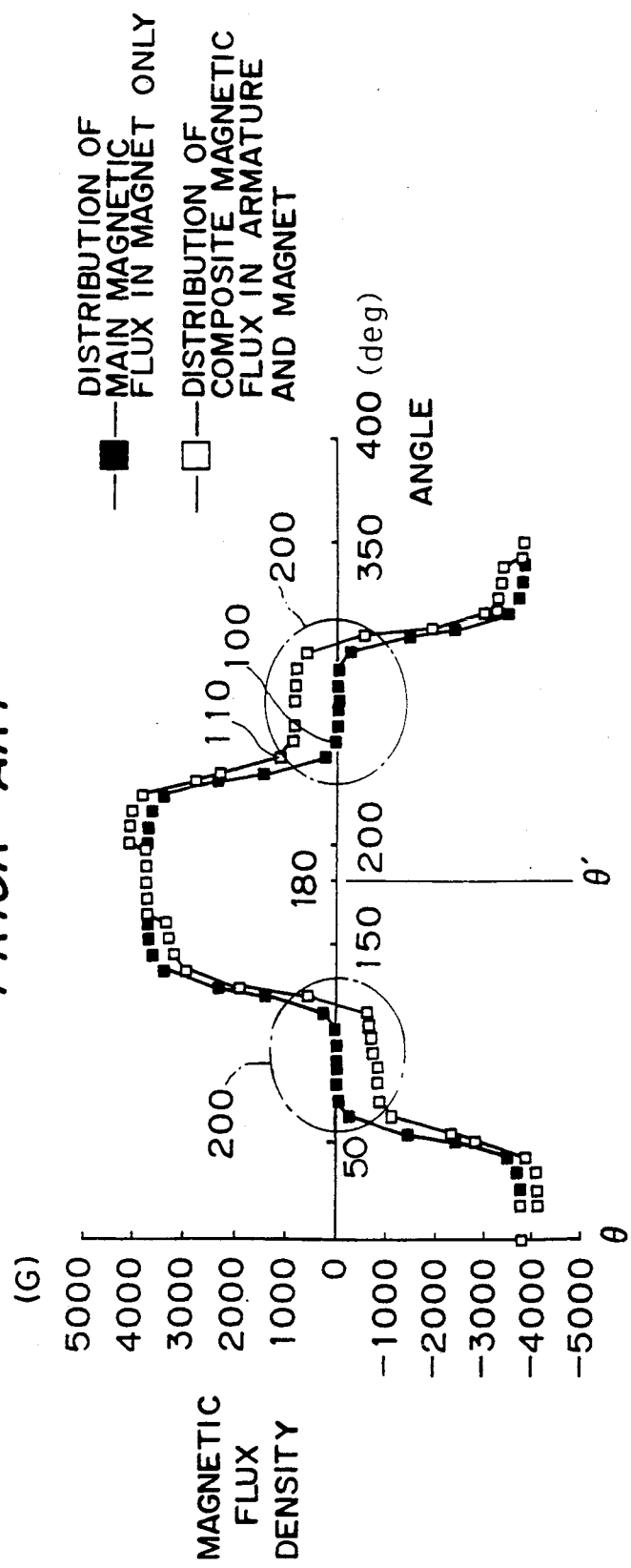
FIG. 4 is a graph illustrating the distribution of magnetic flux in the round yoke type DC motor shown in FIG. 3.

FIG. 2 illustrates the details of the slits 16 formed in the flat yoke 14. FIG. 2A is a side view of the flat yoke in which the slits 16 are formed while FIG. 2B is a cross-sectional view of the flat yoke, taken along a line B—B' in FIG. 2A.

It are preferred that each of the slits 16 is formed to have appropriate width and length as needed. It is particularly preferred that each of the slits, 16 has a width substantially equal to the air gap, d, between the armature 10 and the flat yoke 14. If the width of each slit 16 is too large, the effective magnetic flux will be reduced such that the performance of the motor will be degraded.

The preferred length of each of the slits, 16 is equal to about 1.5 times the core thickness of the armature 10.

On operation, the permanent magnets 12 generate a main magnetic flux 100 which passes through a magnetic circuit as shown by arrows in FIG. 1. The main magnetic flux 100 is divided into two parts at the inner walls of the permanent magnets 12. Thus, the magnetic flux density will be greatly reduced at the central positions in the inner walls of the respective permanent magnets 12. Therefore, the provision of the slits, 16, providing larger reluctances adjacent the inner walls of the permanent magnets 12 will not significantly influence the main magnetic flux and thus the effective magnetic flux in the motor.

On the other hand, the cross magnetomotive force (which is generated by energizing the armature coil) produces a magnetic flux 120 which passes through a magnetic circuit shown by arrows in FIG. 1. This magnetic flux 120 is divided into two parts in one of the flat yoke sections 14b at the central position thereof. The magnetic flux parts pass through the respective arcuate yoke sections 14a and are combined at the other flat yoke section 14b. Thus, the magnetic flux, 120, must pass across the respective slits 16 adjacent the inner walls of the permanent magnets 12. As a result, the magnetic flux 120 will be reduced by the magnetic reluctance provided by the slits 16.

Even if the air gap d between the flat yoke 14 and the armature 10 is relatively small the magnetic reluctance against the cross magnetomotive force, the pair of slits 16 formed in the flat yoke 14 function to increase the magnetic reluctance against the cross magnetomotive force. The affect from the armature reaction can be greatly reduced, in comparison with the flat yoke type DC motor constructed according to the prior art.

The present invention simply requires that slits, 16, be formed in the flat yoke 14 of the conventional flat yoke type DC motor. Therefore, one can provide a flat yoke type DC motor less influenced by the armature reaction without much modification of the existing flat yoke type DC motor.

Figure 5:
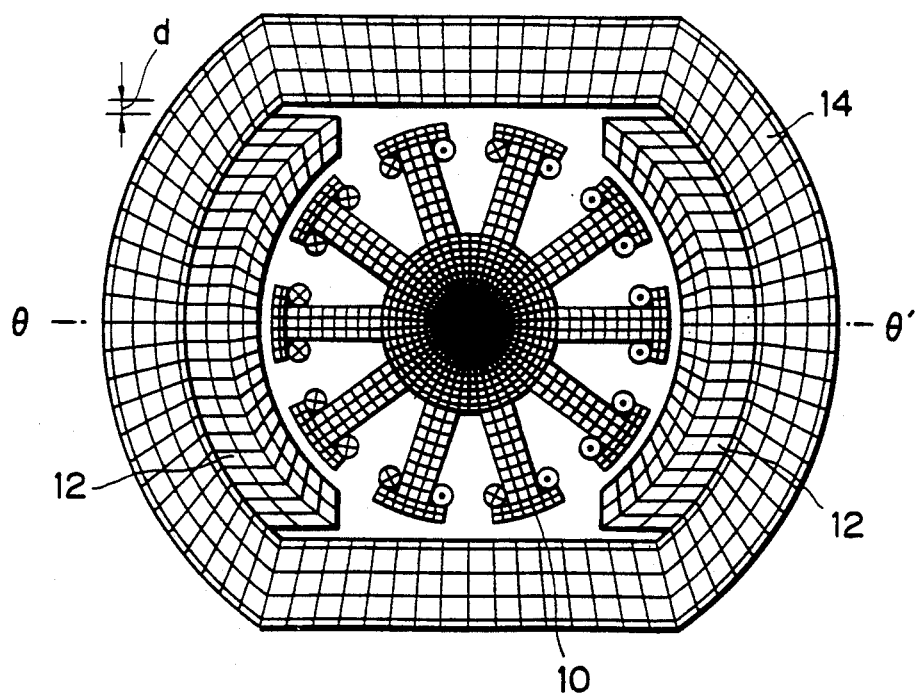
FIG. 5 is a schematic view illustrating a flat yoke type DC motor constructed in accordance with the prior art.

FIG. 7 shows a distribution of magnetic flux density when the pair of slits 16 as shown in FIG. 1 are formed in the prior art flat yoke type DC motor shown in FIG. 5.

As will be apparent from FIG. 7, the distribution of composite magnetic flux 110 in the rectified zone 200 of the motor is greatly reduced, in comparison with the prior art flat yoke type DC motor with no slit as shown in FIG. 6.

The present invention can provide a small-sized and high-power flat yoke type DC motor which is less influenced by the armature reaction. Such a DC motor can be used in the wide range of applications such as motor-car power-window motors, power-seat motors and other motors.

It is thus to be understood that the present invention is not limited to the aforementioned embodiment and can be carried out with various modifications and changes without departing from the spirit and scope of the invention as defined in the appended claims.

For example, the pair of slits 16 may be replaced by a pair of magnetic reluctance members which are made of a material of high magnetic reluctance.

Although the present invention has been described as to the flat yoke type DC motor, it may be similarly applied to a flat yoke type DC generator.

We claim:

1. A DC machine comprising:
   a flat yoke having a pair of arcuate sections and a pair of flat sections that define an inner periphery of said yoke;
   magnetic stator poles provided on the inner periphery of said flat yoke;
   an armature supported in said flat yoke for rotation about a rotational axis wherein said armature has a core, said core having a longitudinal thickness parallel to said rotational axis; and
   magnetic reluctance means located in said yoke for increasing a reluctance of a magnetic circuit through which passes a magnetic flux generated by a cross magnetomotive force, said magnetic reluctance means being located in each of said arcuate sections of said flat yoke adjacent said magnetic stator poles.

2. A DC machine as defined in claim 1 wherein said magnetic reluctance means is formed to provide a region having a given width, which region is located in a central portion of each of said arcuate sections between opposite ends of said magnetic stator poles and extends parallel to the rotational axis of said armature.

3. A DC machine as defined in claim 1 wherein said magnetic reluctance means is in the form of a slit having a given width, which slit is located in a central portion of each of said arcuate sections between opposite ends of said magnetic stator poles and extends parallel to the rotational axis of said armature.

4. A DC machine as defined in claim 3 wherein each of said slits has a slit width substantially equal to an air gap between said armature and said flat yoke.

5. A DC machine as defined in claim 4 wherein each of said slits has a length along the rotational axis at least about 1.5 times the longitudinal core thickness of said armature.

6. A DC machine as defined in claim 3 wherein each of said slits has a length along the rotational axis at least about 1.5 times the longitudinal core thickness of said armature.

7. A DC machine as defined in claim 1 wherein said magnetic reluctance means includes at least a pair of high reluctance members each having a given width, each of said members being located in a central portion of each of said arcuate sections between opposite ends of said magnetic stator poles and extending parallel to the rotational axis of said armature.

* * * * *